US012784303B2

(12) United States Patent
Jeong et al.

(10) Patent No.: US 12,784,303 B2
(45) Date of Patent: Nov. 3, 2026

(54) SYSTEMS AND METHODS FOR PERFORMING BULK DESIGN EDITS

(71) Applicant: Canva Pty Ltd, Surry Hills (AU)

(72) Inventors: Yoo Sun Jeong, Sydney (AU); Junjie Chen, Sydney (AU); Oliver Daniel Richards, Sydney (AU); Seung Jun Lee, Sydney (AU); David Alan Naseby, Sydney (AU); Michael John Pearson, Sydney (AU); Joshua Neil Bloom, Sydney (AU)

(73) Assignee: Canva Pty Ltd, Surry Hills (AU)

( * ) Notice: Subject to any disclaimer, the term of this patent is extended or adjusted under 35 U.S.C. 154(b) by 147 days.

(21) Appl. No.: 18/599,449

(22) Filed: Mar. 8, 2024

(65) Prior Publication Data

US 2024/0303886 A1 Sep. 12, 2024

(30) Foreign Application Priority Data

Mar. 10, 2023 (AU) ................................ 2023201507

(51) Int. Cl.
*G06T 11/60* (2026.01)

(52) U.S. Cl.
CPC .................................... *G06T 11/60* (2013.01)

(58) Field of Classification Search
None
See application file for complete search history.

(56) References Cited

U.S. PATENT DOCUMENTS

| | | | |
|---|---|---|---|
| 6,883,140 B1 | 4/2005 | Acker et al. | |
| 7,617,449 B2 | 11/2009 | Carlson et al. | |
| 7,683,916 B2 | 3/2010 | Bossut et al. | |
| 2008/0016491 A1 | 1/2008 | Doepke | |
| 2014/0267379 A1 | 9/2014 | Mereu et al. | |
| 2017/0278289 A1* | 9/2017 | Marino | G06T 7/536 |
| 2019/0333258 A1* | 10/2019 | Salian | G06F 8/34 |
| 2022/0292748 A1* | 9/2022 | Benaim | H04N 21/234336 |
| 2022/0405270 A1 | 12/2022 | Zara | |

FOREIGN PATENT DOCUMENTS

WO 2020210867 A1 10/2020

OTHER PUBLICATIONS

Examination Report No. 1 for Australian No. 2023201507 mailed May 16, 2023, pp. 1-7.

(Continued)

*Primary Examiner* — Yanna Wu
(74) *Attorney, Agent, or Firm* — GrowIP Law Group LLC

(57) ABSTRACT

Described herein is a computer implemented method. The method includes receiving data identifying an original asset and data identifying a replacement asset; identifying, by one or more computer processing units, a set of associated designs, the set of associated designs including one or more associated designs that include the original asset; and performing, by the one or more computer processing units, a bulk edit process, the bulk edit process including editing a first associated design from the set of associated designs by replacing each instance of the original asset in the first design with the replacement asset.

19 Claims, 7 Drawing Sheets

(56) References Cited

OTHER PUBLICATIONS

Graphic Design—Updating artwork across multiple artboards simultaneously https://web.archive.org/web/20230120005238/https://graphicdesign.stackexchange.com/questions/68075/up dating-artwork-across-multiple-artboards-simultaneously, captured Jan. 20, 2023 as per Wayback Machine (retrieved from the Internet May 15, 2023), pp. 1-5.
Examination Report No. 1 for Australian Patent Application No. 2023201995 mailed Jul. 4, 2024, pp. 1-6.
Manage Graphics Links [retrieved from the Internet Jul. 24, 2024], https://web.archive.org/web/20221201232848/https://helpx.adobe.com/au/indesign/using/graphics-links.html, published Dec. 1, 2022 as per Wayback Machine, pp. 1-6.

* cited by examiner

SYSTEMS AND METHODS FOR PERFORMING BULK DESIGN EDITS

CROSS-REFERENCE TO RELATED APPLICATION

This application is a U.S. Non-Provisional application that claims priority to Australian Patent Application No. 2023201507, filed Mar. 10, 2023, which is hereby incorporated by reference in its entirety.

TECHNICAL FIELD

Aspects of the present disclosure are directed to systems and methods for performing bulk design edits.

BACKGROUND

Various computer applications for creating, editing, and publishing graphic designs exist.

Generally speaking, such applications allow users to create a design by, for example, adding design elements to a page or canvas.

Once a design has been created a user may wish to return to that design and make edits to it.

SUMMARY

Described herein is a computer implemented method including: receiving data identifying an original asset and data identifying a replacement asset; identifying, by one or more computer processing units, a set of associated designs, the set of associated designs including one or more associated designs that include at least one instance of the original asset; and performing, by the one or more computer processing units, a bulk edit process, the bulk edit process including editing a first associated design from the set of associated designs by replacing each instance of the original asset in the first design with an instance of the replacement asset.

Also described herein is a computer implemented method including: detecting a first event, the first event being an add asset event and indicating that a first instance of a first asset has been added to a first design; and in response to detecting the first event, updating asset usage data to indicate that an instance of the first asset has been added to the first design.

Also described herein is a computer implemented method including: detecting a first event, the first event being an add asset event and indicating that a first instance of a first asset has been added to a first design; and in response to detecting the first event, emitting a first message with data indicating that an instance of the first asset has been added to the first design.

Figure 1:
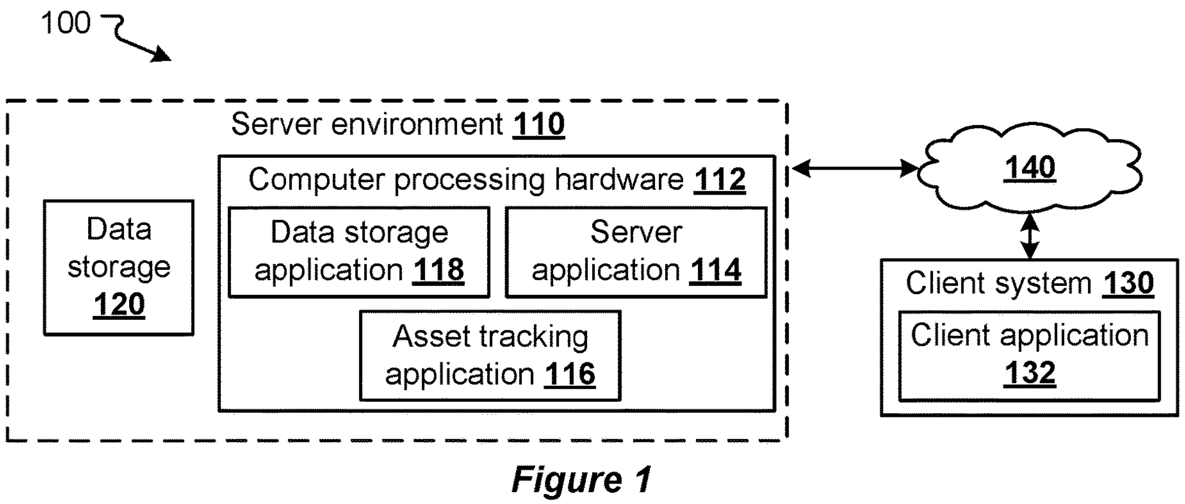
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described above, various design editing applications for creating and editing designs exist. For a user of such an application, situations may arise where there is a need to edit particular elements of existing designs. For example, a user may have used a common image across several designs and wish to change that image across all designs it has been used in.

Where a user only has a small number of designs such edits are reasonably straight forward: the user can open their designs one-by-one and if a given design includes the image they wish to change they can make the desired edit.

In many cases, however, a user may create or be responsible for a large number of designs. In this case performing such edits can be challenging.

Consider, as one example, a user who is (or is part of a team that is) responsible for the designs of a particular organisation. Such designs could include, for example, various templates that are used by the organisation to perform its work, marketing material, education material, business cards, product designs/mock-ups, and/or other designs. A large proportion of such designs may include the organisation's logo. If the organisation changes its logo, all designs that include the previous logo will need to be edited.

In a situation such as this, having a user (or team of users) go through the organisation's designs to identify which designs use the old logo and individually edit each relevant design as required is a time consuming and laborious process-potentially prohibitively so.

Where a large number of designs is involved, actually identifying relevant designs poses an initial challenge. Designs may need to be individually opened and inspected to determine whether editing is actually required. This is time consuming and prone to error: designs that should be edited may be missed either due to not being considered, or being considered and misidentified. Moreover, the process of accessing and opening each potentially relevant design consumes computational and communications resources. For example, in an architecture where designs are remotely stored (e.g. at a server or the like), opening a given design requires that design to be retrieved from the remote store and processed by the user's local device to be opened/rendered for viewing. If a user (or team of users) is reviewing hundreds or thousands of designs, the network and processing load (both client and server side) add up.

The present disclosure describes techniques that can be used to assist in such tasks.

In particular, the present disclosure describes techniques for identifying designs that a particular design asset has been used in. The present disclosure also describes techniques for bulk editing a set of designs in order to replace instances of a particular design asset with a new design asset.

As used herein, the term design asset (or asset for short) refers to a content item, instances of which can be used in designs. In the present disclosure, an asset is associated with a unique identifier (referred to as an asset identifier). Asset identifiers are typically automatically generated and assigned to assets by the design application or platform that those assets have been added to.

Design assets may be image-type assets. Examples of image-type assets include stock photographs (which may be available to all users of a design platform, either on a free or paid basis), business logos (which may be restricted to particular users of a design platform), and/or other raster or vector graphic images. By way of further example, design assets may be video-type assets, audio-type assets, and/or other types of assets.

The techniques disclosed herein are described in the context of a digital design platform that is configured to facilitate various operations concerned with digital designs. In the context of the present disclosure, these operations relevantly include asset usage tracking and bulk editing of designs.

A digital design platform may take various forms. In the embodiments described herein the digital design platform is a client-server type platform. The techniques described herein can, however, be performed (or be adapted to be performed) by a stand-alone digital design platform (e.g. a single application or set of applications that run on a user's computer processing system and perform the techniques described herein without requiring server-side operations).

FIG. 1 is a diagram depicting a networked environment 100 in which various features of the present disclosure may be implemented.

Networked environment 100 includes a server environment 110 and a client system 130 which communicate via one or more communications networks 140 (e.g. the Internet).

Generally speaking, the server environment 110 includes computer processing hardware 112 (discussed below) on which applications that provide server-side functionality to client applications such as client application 132 (described below) execute. In the present example, server environment 110 includes a server application 114 (which may also be referred to as a front end server application), an asset tracking application 116, and a data storage application 1118.

In the present embodiment, the server application 114 executes to provide a client application endpoint that is accessible over communications network 140. For example, where server application 114 serves web browser client applications the server application 114 will be a web server which receives and responds (for example) to HTTP requests. Where server application 114 serves native client applications, server application 114 will be an application server configured to receive, process, and respond to specifically defined API calls received from those client applications. The server environment 110 may include one or more web server applications and/or one or more application server applications allowing it to interact with both web and native client applications.

In the present example, server application 114 (and/or other applications of server environment 110) facilitates various functions related to digital designs. These may include, for example, design creation, editing, storage, organisation, searching, storage, retrieval, viewing, sharing, publishing, and/or other functions related to digital designs. The server application 114 (and/or other applications) may also facilitate additional, related functions such as user account creation and management, user group creation and management, user and user group permission management, user authentication, and/or other server side functions.

In the present example, the asset tracking application performs operations to monitor the usage of assets in designs and maintain asset usage data (as described in detail below). Although the asset tracking application 116 is described and illustrated as a separate application in the present example, the functions performed by this application could be performed by one or more other applications (e.g. by server application 114 itself).

In the present example, the data storage application 118 executes to receive and process requests to persistently store and retrieve data relevant to the operations performed/services provided by the server environment 110. Such requests may be received from the server application 114, asset tracking application 116, other server environment applications, and/or (in some instances) directly from client applications such as 132. Data relevant to the operations performed/services provided by the server environment 110 may include, for example, user account data, user design data (i.e. data describing designs that have been created by users), template design data (e.g. templates that can be used by users to create designs), design asset data (e.g. data in respect of design assets that users may use when creating and/or editing designs), and/or other data relevant to the operation of the server environment 110.

The data storage application 118 may, for example, be a relational database management application or an alternative application for storing and retrieving data from data storage 120. Data storage 1201 may be any appropriate data storage device (or set of devices), for example one or more non-transitory computer readable storage devices such as hard disks, solid state drives, tape drives, or alternative computer readable storage devices.

In server environment 110, server application 114 persistently stores data to data storage device 118 via the data storage application 118. In alternative implementations, however, the server application 114 may be configured to directly interact with data storage devices such as 118 to store and retrieve data (in which case a separate data storage application may not be needed). Furthermore, while a single data storage application 118 is described, server environment 110 may include multiple data storage applications. For example one data storage application 118 may be used for user account data, another for user design data, another for template design data and/or design asset data and so forth. In this case, each data storage application may interface with one or more shared data storage devices and/or one or more dedicated data storage devices, and each data storage application may receive/respond to requests from various server-side and/or client-side applications (including, for example server application 114).

As noted, the server environment 110 applications run on (or are executed by) computer processing hardware 112. Computer processing hardware 112 includes one or more computer processing systems. The precise number and nature of those systems will depend on the architecture of the server environment 110.

For example, in one implementation each server environment application may run on its own dedicated computer processing system. In an alternative implementation, two or more server environment applications may run on a common/shared computer processing system. In a further alternative implementation, server environment 110 is a scalable environment in which application instances (and the computer processing hardware 112—i.e. the specific computer processing systems required to run those instances) are commissioned and decommissioned according to demand—e.g. in a public or private cloud-type system. In this case, server environment 110 may simultaneously run multiple instances of each application (on one or multiple computer processing systems) as required by client demand. Where server environment 110 is a scalable system it will include additional applications to those illustrated and described. As one example, the server environment 110 may include a load balancing application which operates to determine demand, direct client traffic to the appropriate server application instance 114 (where multiple server applications 114 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

Communication between the applications and computer processing systems of the server environment 110 may be by any appropriate means, for example direct communication or networked communication over one or more local area networks, wide area networks, and/or public networks (with a secure logical overlay, such as a VPN, if required).

Client system 130 hosts a client application 132 which, when executed by the client system 130, configures the client system 132 to provide client-side functionality/interact with server environment 110 (or, more specifically, the server application 114 and/or other applications provided by the server environment 110). Via the client application 132, and as discussed in detail below, a user can make use of the various techniques and features described herein.

The client application 132 may be a general web browser application which accesses the server application 114 via an appropriate uniform resource locator (URL) and communicates with the server application 114 via general world-wide-web protocols (e.g. http, https, ftp). Alternatively, the client application 132 may be a native application programmed to communicate with server application 114 using defined application programming interface (API) calls and responses.

A given client system such as 130 may have more than one client application 132 installed and executing thereon. For example, a client system 130 may have a (or multiple) general web browser application(s) and a native client application.

The present disclosure describes various operations that are performed by applications of the server environment 110 and client application 132. Generally speaking, however, operations described as being performed by a particular application (e.g. server application 114) could be performed by (or in conjunction with) one or more alternative applications, and/or operations described as being performed by multiple separate applications could in some instances be performed by a single application.

Furthermore, and as noted above, while the embodiments described below make use of a client-server architecture, the techniques and processing described herein could be adapted to be executed in a stand-alone context—e.g. by an application (or set of applications) that run on a computer processing system and can perform all required functionality without need of a server environment or application.

As noted, the techniques and operations described herein are performed by one or more computer processing systems.

By way of example, client system 130 may be any computer processing system which is configured (or configurable) by hardware and/or software—e.g. client application 132—to offer client-side functionality. A client system 130 may be a desktop computer, laptop computer, tablet computing device, mobile/smart phone, or other appropriate computer processing system.

Similarly, the applications of server environment 110 are also executed by one or more computer processing systems (the computer processing hardware 112). Server environment computer processing systems will typically be server systems, though again may be any appropriate computer processing systems.

Figure 2:
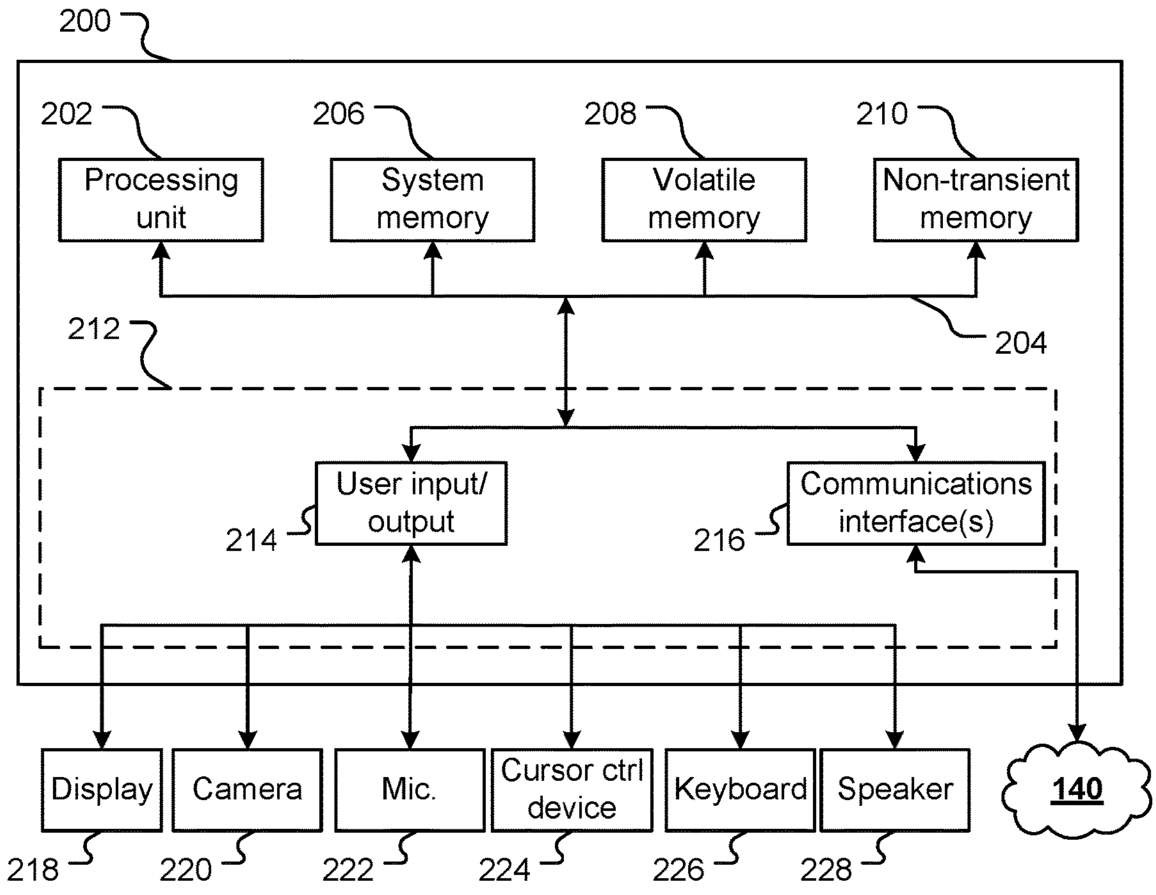
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable (either in a shared or dedicated manner) by system 200.

Through a communications bus 204 the processing unit 202 is in data communication with a one or more machine readable storage (memory) devices which store computer readable instructions and/or data which are executed by the processing unit 202 to control operation of the processing system 200. In this example, system 200 includes a system memory 206 (e.g. a BIOS), volatile memory 208 (e.g. random access memory such as one or more DRAM modules), and non-transitory memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, the connection between the device and system 200 may be via wired or wireless hardware and communication protocols, and may be a direct or an indirect (e.g. networked) connection.

Generally speaking, and depending on the particular system in question, devices to which system 200 connects include one or more input devices to allow data to be input into/received by system 200 and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may, for example, include a keyboard, a pointing device (such as a mouse or trackpad), a touch screen, and/or other input devices. System 200 may also include or connect to one or more output devices controlled by system 200 to output information. Such output devices may, for example, include one or more display devices (e.g. a LCD, LED, touch screen, or other display devices) and/or other output devices. System 200 may also include or connect to devices which act as both input and output devices, for example touch screen displays (which can receive touch signals/input and display/output data) and memory devices (from which data can be read and to which data can be written).

By way of example, where system 200 is a client system such as 130 it may include a display 218 (which may be a touch screen display), a camera device 220, a microphone device 222 (which may be integrated with the camera device), a cursor control device 224 (e.g. a mouse, trackpad, or other cursor control device), a keyboard 226, and a speaker device 228.

System 200 also includes one or more communications interfaces 216 for communication with a network, such as network 140 of environment 100 (and/or a local network within the server environment 110). Via the communications interface(s) 216, system 200 can communicate data to and receive data from networked systems and/or devices.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (which may also referred to as computer software or computer programs). Generally speaking, such applications include computer readable instructions and data which, when executed by processing unit 202, configure system 200 to receive, process, and output data. Instructions and data can be stored on non-transitory machine readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, and referring to the networked environment of FIG. 1 above, server environment 110 includes one or more systems which run a server application 114, an asset tracking application 116, and a data storage application 1118. Similarly, client system 130 runs a client application 132.

In some cases part or all of a given computer-implemented method will be performed by system 200 itself, while in other cases processing may be performed by other devices in data communication with system 200.

Figure 3:
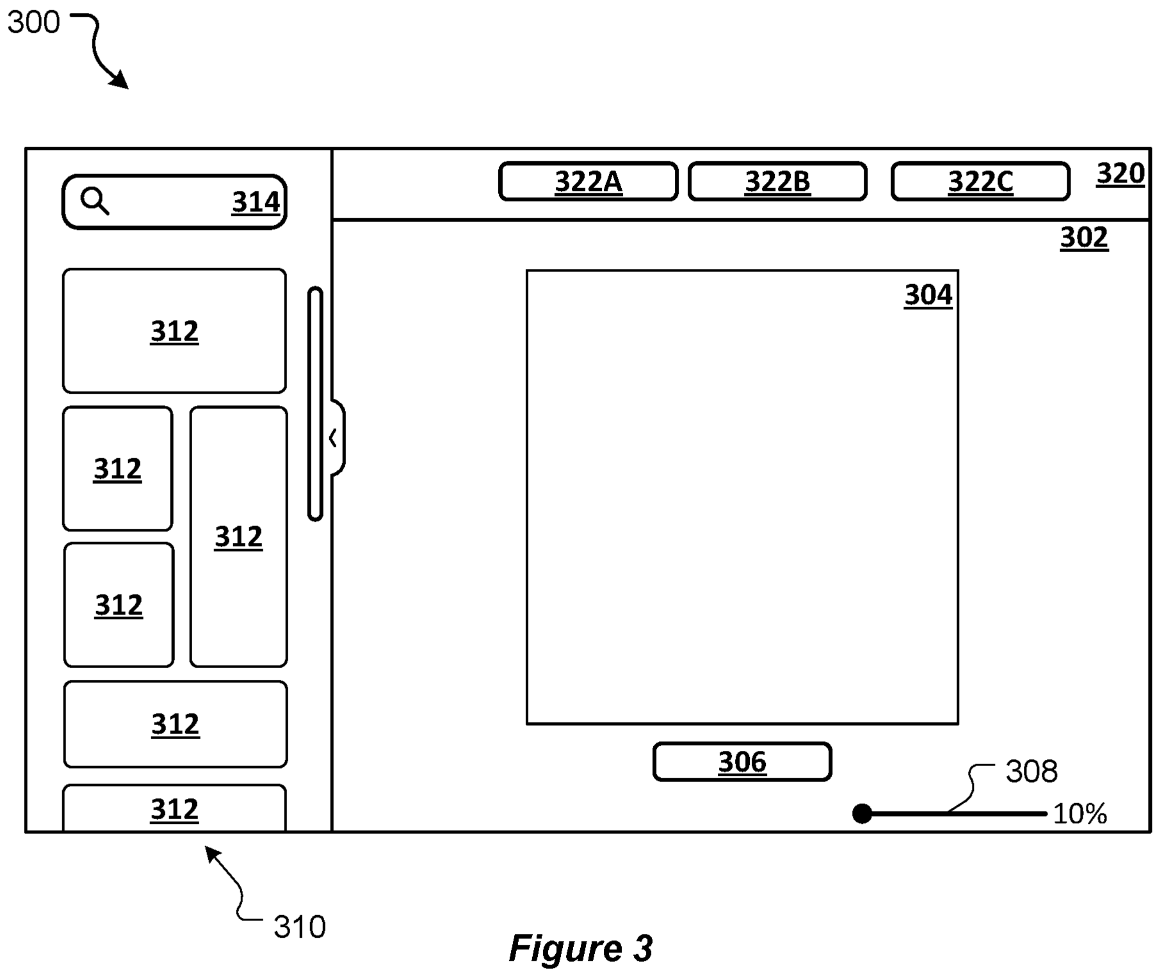
FIG. 3 depicts an example editor user interface.

In the present disclosure, client application 132 configures the client system to provide an editor user interface (UI). Generally speaking, the editor UI will allow a user to create, edit, and output designs. FIG. 3 provides a simplified and partial example of an editor UI 300. In this example, the editor UI 300 is a graphical user interface (GUI).

Editor UI 300 includes a design preview area 302 on which a canvas 304 is shown. Canvas 304 is used to display a page (or, in some cases multiple pages) of a design that is being created and/or edited. In this example, an add page control 306 is provided (which, if activated by a user, causes a new page to be added to the design being created) and a zoom control 308 (which a user can interact with to zoom into/out of page currently displayed by canvas 304).

GUI 300 also includes an asset preview area 310. Asset preview area 310 displays previews 312 of assets that are available to users to assist in creating designs.

Different types of assets may be made available. For example, image assets (such as raster images, vector graphics, shapes, and other image assets), video assets, audio assets, template designs, design styles (e.g. defined sets of colours, font types, and/or other styles), and/or other assets that a user may use when creating their design. For example, a preview 312 may be of an image asset and a user may add that asset to the design being created by dragging and dropping the preview 312 onto the canvas 304. This may cause the client application 132 to generate a design element that includes the asset (or a reference to it) and add that element to the design. (Design elements are discussed further below.) Design assets may be added to a design in other ways.

Asset preview area 310 also includes a search control 314 via which a user can submit search data (e.g. a string of characters) to search for particular design assets. Previews 312 of the search results returned are then displayed in the asset preview area 310.

Depending on implementation, the previews 312 displayed in asset preview area 310 (and the design assets corresponding to those previews) may be accessed from various locations. For example, in a client-server platform assets will typically be managed by one or more server applications (such as server application 114) and stored in the server environment (e.g. in data storage 120). Alternatively (or in addition), be stored memory that is locally accessible to the system 130 on which application 132 executes (e.g. non-transitory memory such as 210 or other locally accessible memory).

Editor UI 300 also includes an additional controls area 320 which, in this example, is used to display additional controls 322. The additional controls 320 may include permanent controls (e.g. controls such as save, download, print, share, publish, and/or other controls that are frequently used/widely applicable and that application 132 is configured to permanently display); user configurable controls (which a user can select to add to or remove from area 320), and/or adaptive controls (which may automatically change depending, for example, on the type of design element that is currently selected/being interacted with by a user). For example, if a text element is selected, adaptive controls such as font style, type, size, position/justification, and/or other font related controls may be displayed. Alternatively, if a vector graphic element is selected, adaptive controls such as fill attributes, line attributes, transparency, and/or other vector graphic related controls may be displayed.

Once a design has been created, application 132 may provide various options for outputting that design. For example, application 132 may provide a user with options to output a design by one or more of: saving the design to local memory of client system 130 (e.g. non-transitory memory 210); saving the design to data store 118 of server environment 110; printing the design to a printer (local or networked); communicating the design to another user (e.g. by email, instant message, or other electronic communication channel); publishing the design to a social media platform or other service (e.g. by sending the design to a third party server system with appropriate API commands to publish the design); and/or by other output means.

Data in respect of designs that have been (or are being) created may be stored in various formats. An example design data format that will be used throughout this disclosure for illustrative purposes will now be described. Alternative design data formats (which make use of the same or alternative design attributes) are, however, possible, and the processing described herein can be adapted for alternative formats.

In the present context, data in respect of a particular design is stored in a design record. Generally speaking, a design record defines certain design-level attributes and includes page data.

A design's page data defines (or references) one or more page records. Each page record defines a page of the design via one or more page-level attributes and element data.

In the present example, the format of each design record is a device independent format comprising a set of key-value pairs (e.g. a map or dictionary). To assist with understanding, a partial example of a design record format is as follows:

| Attribute | Example |
|---|---|
| Design ID | "designId": "abc123" |
| Dimensions | "dimensions": {"width": 1080, "height": 1080} |
| Design type | "type": "Presentation" |
| Template | "Template": "Y" |
| Design name | "name": "Test Doc 3" |
| Design owner | "owner": 12ab34cd |
| Edit time | "edited": "timestamp" |
| Page data | "pages": [{page 1}, ... {page n}] |

In this example, the design-level attributes include: a design identifier (which uniquely identifies the design); page dimensions (e.g. a default page width and height); a design type (e.g. an indicator of a type of the design—e.g. presentation, poster, social media post, website, and/or any other supported design type); a template flag indicating whether the design is a template design or not, which may be used for searching and/or sorting purposes; a design name (e.g. a string defining a default or user specified name for the design); a design owner (e.g. an identifier of a user or group that owns or created the design); a most recent edit time (e.g. a timestamp indicating when the design was last edited); and page data (discussed below). Additional and/or alternative design-level attributes may be provided, such as attributes regarding creation date, design version, design permissions, and/or other design-level attributes.

In this example, a design record's page data is a set (In this example, an array) of page records, each of which defines page data in respect of a page of the design. In this example, a page record's position in a design's page array serves to identify the page and also determines its position in the design (e.g. a page at array index n appears after a page at array index n−1 and before a page at array index n+1). Page order may be alternatively handled, however, for example, by storing page order as an explicit attribute.

To assist with understanding, a partial example of a design record format is as follows:

| Attribute | Example |
|---|---|
| Dimensions | "dimensions": {"width": 1080, "height": 1080} |
| Background | "background": {"assetID": "M12345"} |
| Element data | "elements": [{element 1}, ... {element n}] |

In this example, the page-level attributes include: dimensions (e.g. a page width and height which, if present, override the default page dimensions defined by the design level dimensions attribute described above); background (data indicating any page background that has been set, for example an asset identifier of an image that has been set as the page background, a value indicating a particular colour of a solid background fill, or data indicating an alternative background); and element data (discussed below). Additional and/or alternative page-level attributes may be provided, such as attributes regarding creation date, design version, design permissions, and/or other design-level attributes.

In this example, a design page's element data is a set (in this example, an array) of element records. Each element record defines an element (or a set of grouped elements) that has been added to the page. In this example, an element record's position in a page's elements array serves to identify the element and also determines the depth or z-index of the element (or element group) on the page (e.g. an element at array index n is positioned above an element at array index n−1 and below an element at array index n+1). Element depth may be alternatively handled, however, for example, by storing depth as an explicit element attribute.

Generally speaking, an element record defines an object that has been added to a page—e.g. by copying and pasting, importing from one or more asset libraries (e.g. libraries of images, animations, videos, audio items, etc.), drawing/creating using one or more design tools (e.g. a text tool, a line tool, a rectangle tool, an ellipse tool, a curve tool, a freehand tool, and/or other design tools), or by otherwise being added to a design page.

Different types of design elements may be provided for depending on the system in question. By way of example, design element types such as the following may be provided: graphic elements; video elements; audio elements; text elements; and/or elements of other types.

As will be appreciated, different attributes may be relevant to different element types. For example, any element that holds visual media (e.g. an image, video, text, etc.) will typically be associated with position and size data, while such data may not be relevant to an element that holds audio media. Accordingly, different element record formats (with different attributes) may be used for different element types.

By way of example, an element record for a graphic type element may be as follows:

| Attribute | Note | E.g. |
|---|---|---|
| Type | A value defining the type of the element. | "type": "GRAPHIC" |
| Position | Data defining the position of the element: e.g. an (x, y) coordinate pair defining (for example) the top left point of the element. | "position": (100, 100) |
| Size | Data defining the size of the element: e.g. a (width, height) pair. | "size": (500, 400) |
| Rotation | Data defining any rotation of the element. | "rotation": 0 |
| Opacity | Data defining any opacity of the element (or element group). | "opacity": 1 |
| Asset identifier | Data indicating the asset (e.g. an image) that the element holds/is used to display | "assetID": "M12345" |

As a further example, an element record for a text type element may be as follows:

| Key/field | Note | E.g. |
|---|---|---|
| Type | A value defining the type of the element. | "type": "TEXT", |
| Position | Data defining the position of the element. | "position": (100, 100) |
| Size | Data defining the size of the element. | "size": (500, 400) |
| Rotation | Data defining any rotation of the element. | "rotation": 0 |
| Opacity | Data defining any opacity of the element. | "opacity": 1 |
| Text | Data defining the actual text characters | "text": "Trip" |
| Attributes | Data defining attributes of the text (e.g. font, font size, font style, font colour, character spacing, line spacing, justification, and/or any other relevant attributes) | "attributes": {...} |

As described above, application 132 may provide a drag-and-drop interface for adding design elements to a design. To illustrate this, consider a user who wishes to add an image to a design they are creating. In this case, the user may search for an image via search control 314. In response, image assets matching the search criteria are identified and previews 312 of those image assets are displayed. A user may then drag a particular preview 312 and drop it onto the canvas 304 (the canvas providing a view of a particular page of a particular design) at a particular position. In response, an element record is generated (including, for example, position data based on where the asset was dropped and an asset identifier that identifies the asset that has been dropped on the canvas 304 to create the element). The element record is then added to the relevant page's elements array (e.g. by appending it to the end of the array). In this way an instance of the asset is added to the design.

The storage location for design data (e.g. design records) will depend on implementation. For example, in the networked environment described above design records are (ultimately) stored in/retrieved from the server environment's data storage 120. This involves the client application 132 communicating design data to the server environment 110—for example to the server application 114 which stores the data in data storage 120. Alternatively, or in addition, design data may be locally stored on a client system 130 (e.g. in non-transitory memory 210 thereof).

As described above, assets are associated with asset identifiers. Assets may also be associated with other attributes. As one example, image type assets may be associated with an aspect ratio attribute. The particular attributes associated with a given asset will depend on the type of the asset and the design platform in question.

Asset data may be defined and stored in any appropriate manner. As one example, asset data may be stored in one or more database tables that associate an asset identifier with the location of the asset's data (e.g. a directory path, universal resource locator, or other link/reference to the asset)

Certain embodiments described herein involve maintaining and/or searching asset usage data. Generally speaking, asset usage data is data that associates an asset identifier with any designs that asset is used in.

Various asset usage data formats and attributes are possible. In the present example, asset usage data is defined by a set of asset usage records. Each asset usage record defines an asset identifier (which uniquely identifies an asset and the asset usage record) and includes associated design data. The associated design data is a set (e.g. an array or other set) of one or more associated design records (discussed below).

Each associated design record identifies (e.g. by a design identifier) a particular design that one or more instances of the asset has been used in/added to. Each associated design record may define further attributes. For example, an associated design record may include data indicating whether the design is a template design or no and/or include a "deleted" flag which indicates whether the record indicates a current/active association or a deleted/inactive association.

In certain embodiments, the asset usage data may be stored using a database table, such as a DynamoDB table.

To illustrate this particular format of asset usage data consider the following example of an asset usage record:

"assetID": "M12345",
"designs": [
{"designId": "abc123", "template": "Y", "status": "active", ...},
{"designId": "abc125", "type": "N", "status": "deleted", ...},
{"designId": "abc127", "type": "N", "status": "active", ...}
]

In this example, the asset usage record shows that asset "M12345" is associated with three designs, one of which is a template type design and two of which are user (or non-template) designs.

Alternative formats and attributes for asset usage data may be used. As one alternative example, asset usage data may include a separate record for each unique assetID/designID pair. An example of this (depicted as a table is as follows):

| Asset ID | Design ID | Template | Status | Other attributes ... |
|---|---|---|---|---|
| "M12345" | "abc123" | "Y" | "active" | ... |
| "M12345" | "abc125" | "N" | "deleted" | ... |
| "M12345" | "abc127" | "N" | "active" | ... |

Figure 4:
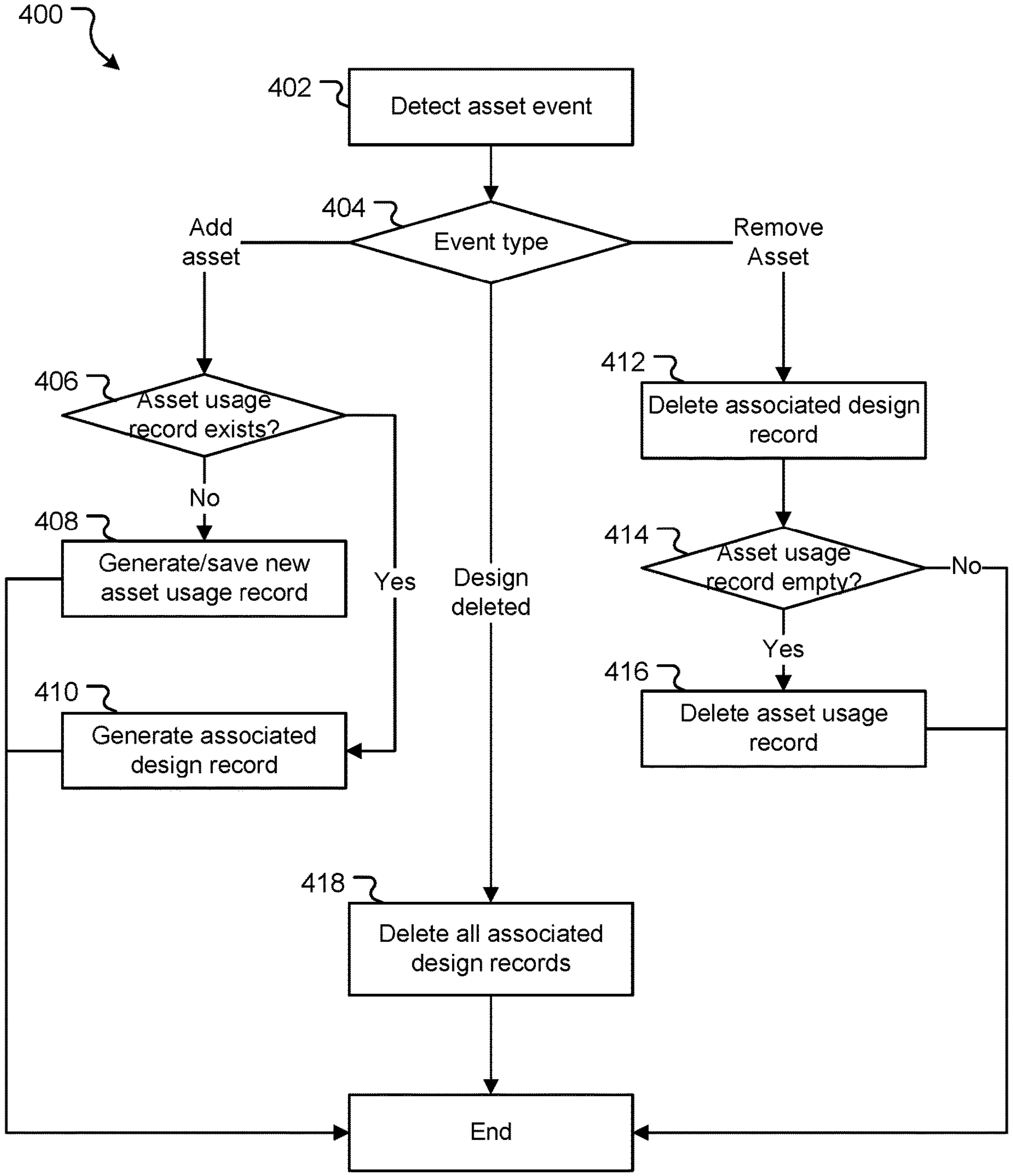
FIG. 4 depicts operations performed in a process for generating and maintaining asset usage data.

Turning to FIG. 4, a computer implemented method 400 for generating and maintaining asset usage data will be described.

The operations of method 400 will be described as being performed by the asset tracking application 116 (also referred to as application 116 for short) running at server environment 110. In alternative embodiments, however, the processing described may be performed by one or more alternative applications running on one or more alternative computer processing systems.

At 402, application 116 detects an asset event.

In the present embodiments, three types of asset events are possible: an add asset event, which occurs when an instance of an asset is added to a design; a remove asset event, which occurs when all instances of an asset have been removed from a design; and a design deleted event which occurs when a design is deleted. Add asset and remove asset events are associated with an asset (e.g. via an asset identifier) and a design (e.g. via a design identifier). A design deleted event is associated with a design (e.g. via a design identifier). The design and/or asset that an asset event is associated with will be referred to as the "event asset" and/or the "event design" respectively.

Application 116 may be configured to detect an asset event in various ways.

In the present example, server application 114 (or an alternative server environment application) is configured to emit asset event messages that indicate asset events. This is discussed below with reference to FIGS. 10, 11 and 12. Receipt of a relevant asset event message by client application 116 is an asset event. Client application 116 may receive or be notified of asset event messages in various ways, for example by subscribing to a publication/subscription type service that the event messages are published to.

Generally speaking, however, server application 114 is configured to emit: an asset added event message on detecting that a new asset is added to a design; an asset deleted event message on detecting that all instances of a particular asset have been deleted from a design; and a design deleted event message on detecting that a design that includes one or more assets is deleted. In each case, the event message may include various data, such as an event time stamp, an event type (e.g. asset added, asset removed, design deleted), an identifier of the asset that has been added or removed (if required), and an identifier of the design the asset has been added to or removed from or that has been deleted. As a subscriber to the publication/subscription service, application 116 detects asset events as they are emitted by the server application 114.

On detection of an asset event, application 114 updates the asset usage data to reflect that event. Generally speaking, where the event is an add asset event, updating the asset usage data involves recording an association between the asset identifier and the design identifier that the event relates to. Where the event is a remove asset event, updating the asset usage data involves deleting (or otherwise flagging as removed) an association between the asset identifier and the design identifier that the event relates to. Where the event is a delete design event, updating the asset usage data involves deleting (or otherwise flagging as removed) associations between any assets and the design identifier that the event relates to.

The particular operations performed to update the asset usage data will depend on the format of the asset usage data. The operations described below are in the context of the asset usage data described above.

At 404, application 116 determines whether the detected event is an add asset event, a remove asset event, or a design deleted event. This determination may, for example, be made based on a type associated with the event message.

If the event is an add asset type event, processing proceeds to 406. At 406, application 116 determines if an asset usage record corresponding to the event asset exists. If no corresponding asset usage record exists, processing proceeds to 408. If a corresponding asset usage record does exist, processing proceeds to 412.

At 408, no asset usage record corresponding to the event asset exists. In this case, application 116 generates and saves a new asset usage record for the event asset. The new asset usage record includes a single associated design record that corresponds to the event design.

For example, if an add asset type event associated with asset A1 and design D1 was received, application 116 may generate and save a new asset usage record such as the following:

```
"assetID": "A1",
"designs": [
  {"designId": "D1", "status": "active",...},
  ]
```

Processing the add asset event is then complete.

At 410, an asset usage record corresponding to the event asset does exist. In this case application 116 generates an associated design record that associates the event asset with the event design and saves this to the existing asset usage record.

Continuing with the example above, if an add asset type event associated with asset A1 and design D2 was received, application 116 would generate a new associated design record for design D2 and add it to the asset usage record for asset A1. E.g.:

```
"assetID": "A1",
"designs": [
  {"designId": "D1", "status": "active" ...},
  {"designId": "D2", "status": "active" ...},
  ]
```

Processing the add asset event is then complete.

If the event is a remove asset type event, processing proceeds to 412. The present example assumes that asset usage has been properly recorded, so that if a remove asset event occurs there must be an asset usage record in respect of the event asset (and that asset usage record must include an associated design record in respect of the event design). In other implementations, however, appropriate checks may be performed to determine the asset usage data includes these records.

At 412, application 116 deletes the associated design record that corresponds to the event design (or otherwise flags that record as inactive/deleted) from the asset usage record associated with the event asset.

Continuing with the example above, if a remove asset type event associated with asset A1 and design D1 was received, application 116 would delete the associated design record in respect of design D1 from the asset usage record associated with asset A1. E.g.:

```
"assetID": "A1",
"designs": [
  {"designId": "D1", "status": "deleted", ...},
  {"designId": "D2", "status": "active", ...},
  ]
```

At 414, following deletion of the associated design record, application 116 determines whether the asset usage record corresponding to the event asset is no longer required. This will be the case if all associated design records have been deleted (or flagged as inactive/deleted).

If, at 414, application 116 determines that the asset usage record corresponding to the event asset is still required, processing the remove asset event is complete.

If, at 414, application 116 determines that the asset usage record corresponding to the event asset is no longer required, processing proceeds to 416. In this case application 116 deletes the asset usage record that corresponds to the event asset (or otherwise flags that record as inactive/deleted).

If the event is a design deleted event, processing proceeds to 418. At 418, application 204 deletes (or flags as inactive/deleted) all associated design records in respect of the event design from all asset usage records.

For example, consider the following example asset usage data associating design D3 with assets A3 and A4:

```
"assetID": "A3",
"designs": [
  {"designId": "D1","status": "active" ...},
  {"designId": "D3", "status": "active" ...},
  ]
"assetID": "A4",
"designs": [
  {"designId": "D3", "status": "active" ...},
  {"designId": "D5", "status": "active" ...},
  ]
```

If a design deleted event identifying design D3 was received, application 116 would delete the relevant associated design records (i.e. those in respect of D3) from all asset usage records (in this case those associated with A3 and A4). E.g.:

```
"assetID": "A3",
"designs": [
  {"designId": "D1","status": "active" ...},
  {"designId": "D3", "status": "deleted" ...},
  ]
"assetID": "A4",
"designs": [
  {"designId": "D3", "status": "active" ...},
  {"designId": "D5", "status": "deleted" ...},
  ]
```

When application 116 deletes an associated design record from a particular asset usage record it may also determine whether that particular asset usage record is no longer required. This will be the case if the particular asset usage record does not include any remaining active associated design records (as per 414 above). If the particular asset usage record is no longer required, application 116 may also delete (or flag as deleted/inactive) the particular asset usage record.

Processing the design deleted event is then complete.

Figure 5:
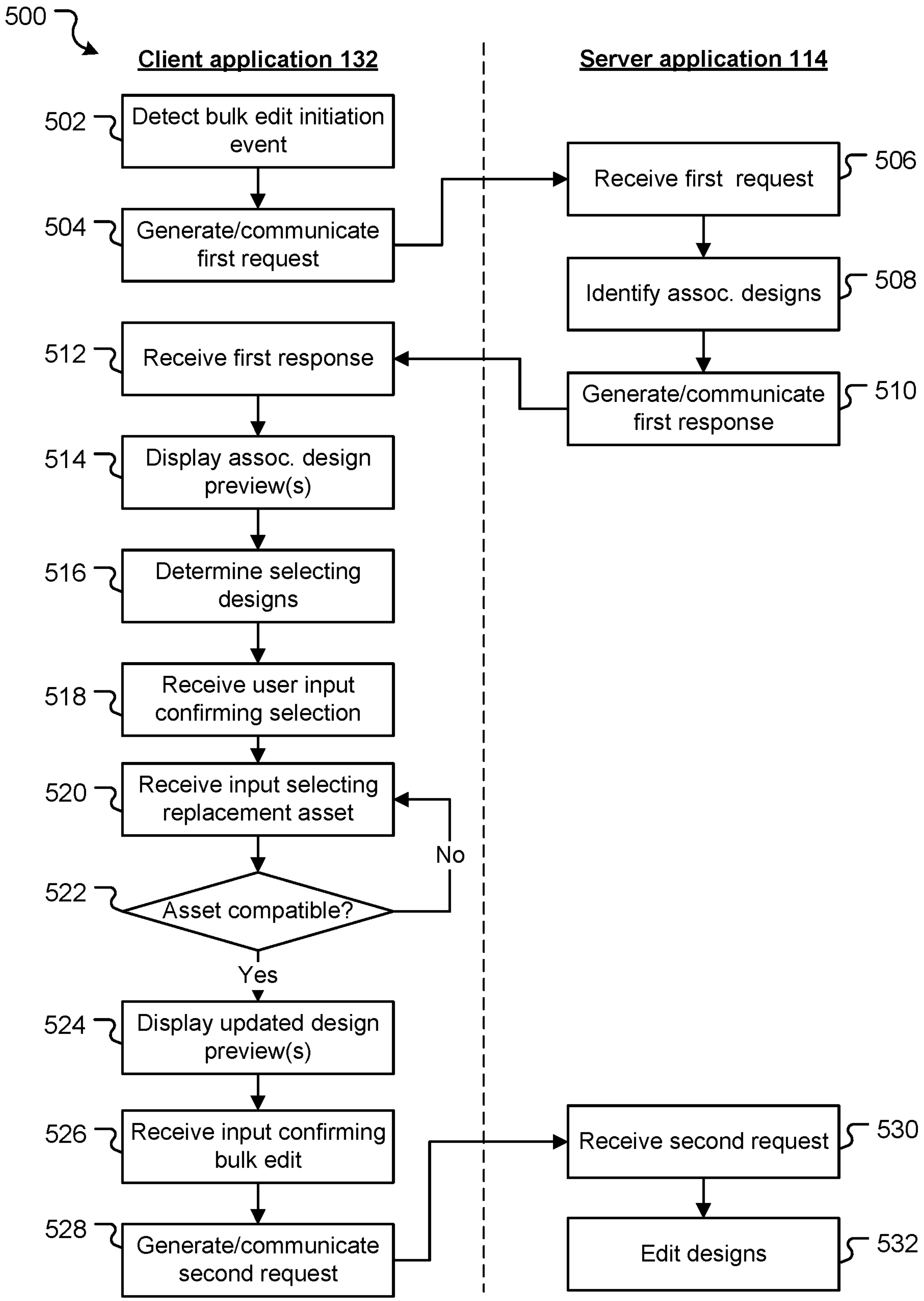
FIG. 5 depicts operations performed in a process for bulk editing designs.

Turning to FIG. 5, a computer implemented method 500 for performing bulk design edits will be described.

The operations of method 500 will be described as being performed by the client application 132 and server application 114 operating together. In alternative embodiments, however, the processing described may be performed by a single application (e.g. in a stand-alone implementation), by one or more alternative applications running on one or more alternative computer processing systems, or by the same applications but with operations being performed by a different application than that described.

Figure 6:
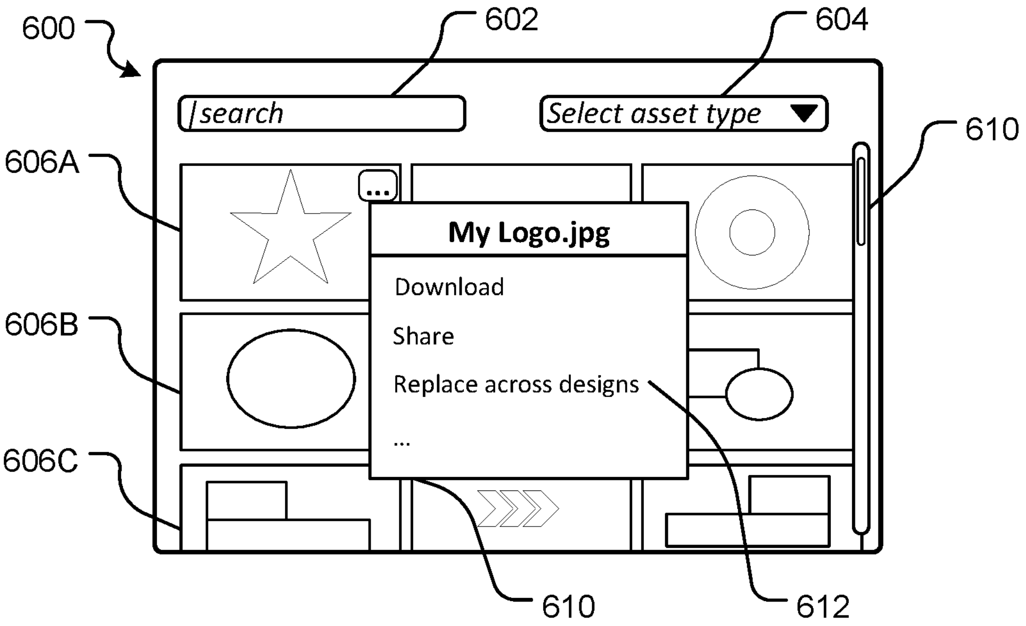
FIG. 6 depicts an example asset selection user interface.
Figure 7:
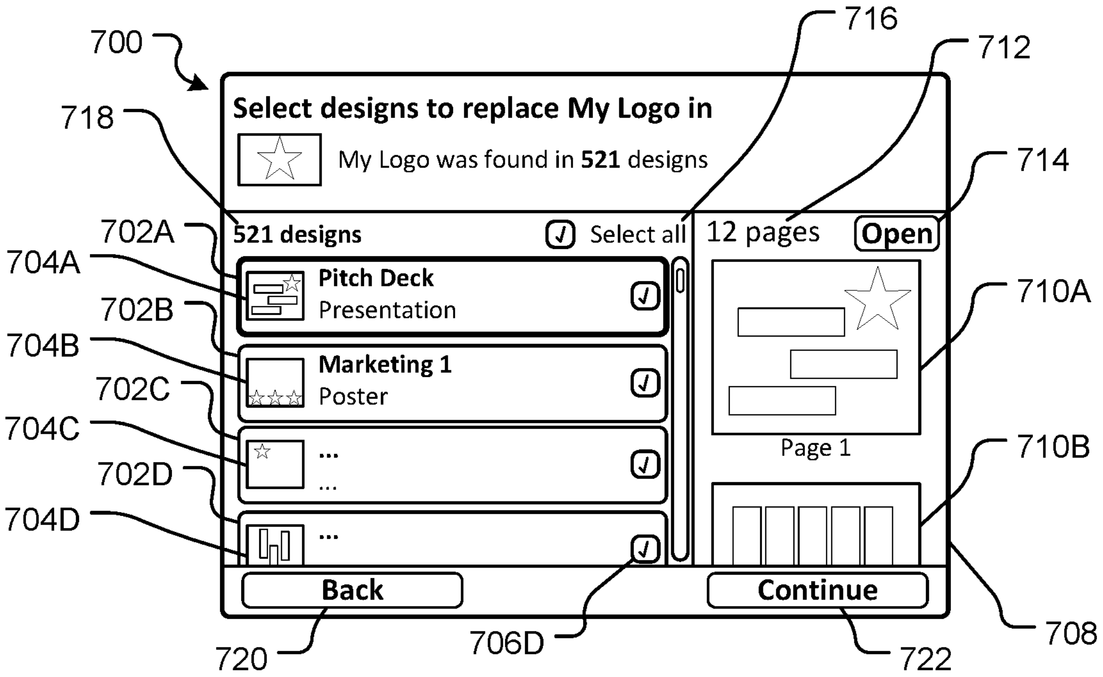
FIG. 7 depicts an example design selection user interface.
Figure 8:
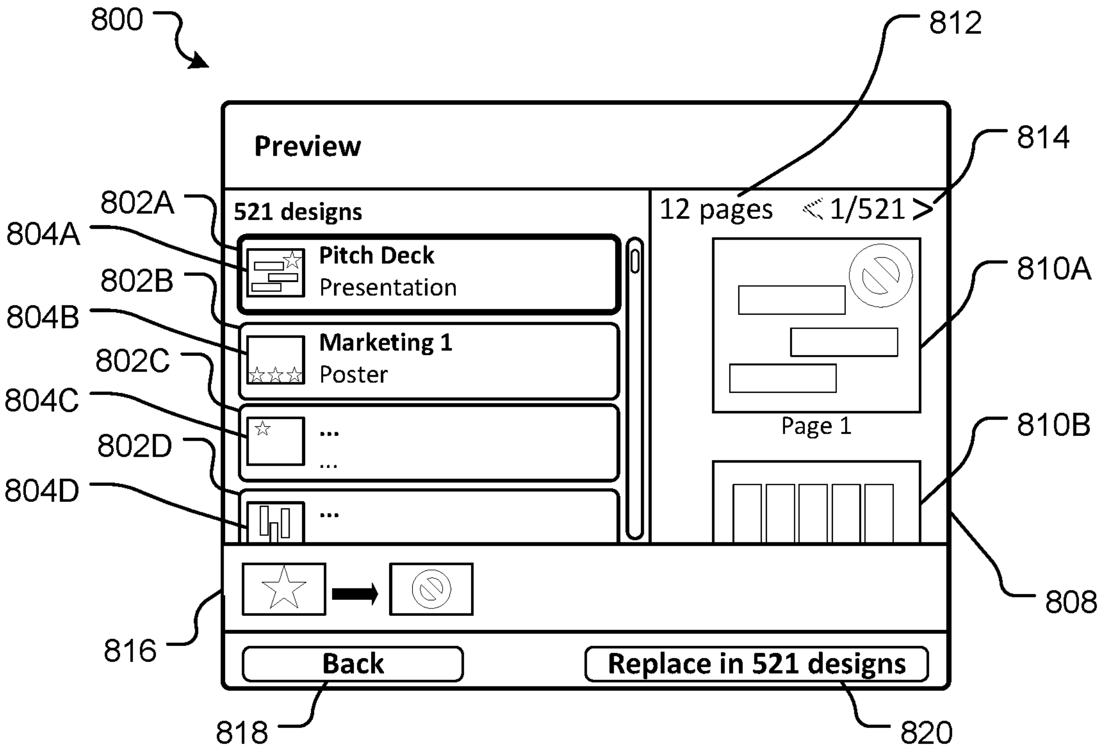
FIG. 8 depicts an example preview user interface.

The operations of method 500 are described with reference to example user interfaces (UIs) as depicted in FIGS. 6 to 8. Each example UI of FIGS. 6 to 8 may, for example, be displayed as an overlay UI atop a main or other UI, e.g. atop editor UI 300 described above.

At 502, client application 132 detects a bulk edit initiation event. The bulk edit initiation event is associated with a particular asset which will be referred to as the original asset.

Various bulk edit initiation events are possible. One example of such an event is detecting user interaction with a bulk edit initiation control, such as control 612 of the example asset selection UI 600 described below with reference to FIG. 6.

Asset selection UI 600 includes an asset search control 602 (to receive user input defining a search string) and an asset type selection control 602 (to receive user input selecting a particular asset type). The types of assets available for selection via control 602 will depend on implementation and the asset types for which the design platform supports bulk edit operations.

Client application 132 (in conjunction with server application 114) is configured to search for assets corresponding to a search string (as entered in control 602) and/or asset type (as selected by control 604) and to display previews 606 of matching assets. In this example, nine previews 606 are displayed or partially displayed (though only three-606A, 606B, and 606C—are provided with reference numerals). In this example, client application 132 also displays a scroll control 608 which indicates more matching asset previews are available.

In this example, client application 132 is configured to detect interaction with a given asset preview 606 (e.g. a mouse hover or click, a touch contact, or an alternative interaction) and, in response, display a menu 610. In this example, menu 610 indicates a name and file type of the selected asset (here "My Logo.jpg") and includes a bulk edit initiation control 612 (labelled "replace across designs").

At 504, in response to detecting the bulk edit initiation event, client application 132 generates a first request (which may also be referred to as an associated designs request) and communicates this to the server application 114. The first request identifies the original asset, e.g. by inclusion of, or association with, an asset identifier. The first request may also include (or be associated with) other information, for example an account identifier of a user account being used to access the bulk edit feature.

At 506, server application 114 receives the first request.

At 508, in response to receiving the first request, server application 114 identifies designs that include one or more instances of the original asset identified by the first request. These will be referred to as associated designs.

In the present embodiments, server application 114 identifies associated designs by querying asset usage data that provides associations between an asset and any designs that the asset has been used in. The asset usage data may, for example, take a format as described above (or a similar format) and/or be generated and maintained according to a process such as that described with reference to FIG. 4 (or a similar process).

Server application 114 may, however, be configured to identify associated designs in alternative ways. For example, server application 114 may be configured to search design records it has access to and identify any design records that reference the original asset. In situations where server application 114 has access to a large number of designs, however, performing a search such as this may be computationally expensive and/or introduce an undesirable delay.

At 510, server application 114 generates a first response (which may also be referred to as an associated designs response) and communicates this to the client application 132. The first response includes data that identifies a set of associated designs—e.g. the design identifier of any associated design that has been identified. In some implementations, the first response may also include data that allows client application 132 to render/display a preview of one or more of the associated designs. If no associated designs are identified, the first response may include an empty set of associated designs or other data indicating that no associated designs have been identified.

At 512, client application 132 receives the first response.

At 514, and assuming one or more associated designs have been identified, client application 132 displays a design selection UI. FIG. 7 provides one example of a design selection UI 700.

In the present example, client application 132 displays the design selection UI 700 to include an associated design indicator 702 for associated designs identified in the first response. Each associated design indicator 702 includes a thumbnail 704 of the design in question, a name of the design and the design type (reference numerals not provided), and a design selection control 706 (only one selection control 706D referenced). For example, design indicator 702A indicates a design with the name "pitch deck" and a design type of "Presentation", and a tick in its selection control indicating the design is currently selected.

Via the design selection UI 700 a user can select a particular associated design (e.g. by interacting with its design indicator). In response to such user input, client application 132 displays a preview of the selected design in a preview region 708. In the example of FIG. 7, the design indicated by associated design indicator 702A is selected (which is visually indicated by the heavier line weight around indicator 702A). Accordingly, preview region 708 displays a preview of this design. Preview region 708 is used by client application 132 to display previews of 710 of each page of the selected design, an indicator 712 of the total number of pages in the design (in this example, 12 pages), and an open design control 714 which, if activated, causes client application 132 to open the design in a "full" view for editing (e.g. in an editor interface such as UI 300 described above).

If the first response includes preview data, client application 132 may display thumbnails 704 and/or page previews 710 based on this data. Alternatively, client application 132 may separately retrieve the data required for the thumbnails 704 and/or page previews 710 from the server application 114 (e.g. in batched or paginated manner depending on which associated designs thumbnails 704 or page previews 710 are actually required for).

Example design selection UI 700 also includes: a select all control 716; an indicator 718 that indicates the total number of associated designs that have been identified (i.e. the number of designs that include the selected asset, in this example, 521); a back control 720; and a continue control 722.

In response to detecting user input activating the select all control 716, client application 132 may be configured to either flag all associated designs as selected (in the event that not all associated designs were already flagged as selected) or to flag all associated designs as deselected (in the event that all associated designs were already flagged as selected).

In response to detecting user input activating the back control 720, client application 132 may be configured to close design selection UI 700. In this case client application 132 may display asset selection UI 600 or an alternative UI such as editor UI 300.

At 516, client application 132 determines a set of selected designs. The set of selected designs includes one or more associated designs that are selected for editing in the bulk edit process.

In example design selection UI 700 described above, client application 132 may be configured to select all associated designs by default. In this case, a user may effectively select all designs by taking no action (i.e. by not deselecting any designs) or may choose to deselect one or more (or all) designs via the controls 706 and/or 716. Alternatively, client application 132 may be configured to select no designs by default. In this case a user may select one or more (or all) designs via the controls 706 and/or 716. More generally, client application 132 may determine the set of selected designs based on zero or more design selection user inputs.

At 518, client application 132 receives user input confirming the set of selected designs determined at 516. This may, for example, be user input activating a continue control such as control 722 of design selection UI 700.

At 520, in response to user input confirming the set of selected designs, client application 132 receives user input selecting a replacement asset. This input may be received via a replacement asset selection UI (not depicted) that is displayed by client application 132. Generally speaking, a replacement asset selection UI will allow a user to search or browse for a replacement asset: i.e. an asset that will replace the original asset. The replacement asset may be an asset that the design platform already has access to. Alternatively, client application 132 may provide controls for a user to upload a new asset (e.g. by identifying an appropriate file). If a new asset is uploaded, client application 132 (and server application 114) perform relevant actions to add the selected file to the design platform as an asset (e.g. by assigning it an asset identifier and storing it as an asset in the relevant database or storage location).

At 522, once a replacement asset has been identified, client application 132 determines whether the replacement asset selected at 520 is compatible with the original asset. Client application 132 may make this determination based on a set of one or more compatibility criteria.

By way of example, one compatibility criteria may be that a type of the replacement asset is the same as a type of the original asset. For example, if the original asset is an image-type asset then the replacement asset must also be an image-type asset. Asset type may be determined, for example, by a file format (e.g. an image-type asset may have allowable formats such as .jpg, .gif, .bmp, .png, .svg, or any other appropriate image format).

As a further example, a compatibility criteria where the original asset is a visual asset (for example an image-type asset of video-type asset) may be that the aspect ratio of the replacement asset is compatible with the aspect ratio of the original asset. Application 132 may determine that the aspect ratio of the replacement asset is compatible with the aspect ratio of the original asset if, for example, the aspect ratios are the same or are within a defined threshold distance of each other.

If client application 132 determines that the replacement asset is not compatible, it may be configured to display an error message indicating this (and, potentially, the reason for the incompatibility) before processing returns to 520 for the user to select a new replacement asset.

If client application 132 determines that the replacement asset is compatible, processing proceeds to 524. At 524, client application 132 displays a preview UI. FIG. 8 provides one example of a preview UI 800.

In the present example, client application 132 uses preview UI 800 to display a selected design indicator 802 for each design in the set of selected designs: i.e. those designs that have been selected for editing. In this example, each selected design indicator 802 includes a thumbnail 804 of the selected design, a name of the design and the design type.

In response to user input selecting a particular selected design (e.g. user interaction with a particular design indicator 802 or with next/previous design controls 814 described below), client application 132 displays a preview of the selected design in a preview region 808. In the example of FIG. 8, the design indicated by indicator 802A is selected (which is visually indicated by the heavier line weight around indicator 802A). Accordingly, preview region 808 displays a preview of this design. In the preview region 808, client application 132 displays: a preview 810 of each page of the selected design; an indicator 812 of the total number of pages in the design (in this example, 12 pages); and a next/previous design control 814 which can be used to select a next (if possible) or previous (if possible) design to be previewed in the preview region 808.

In the present embodiment, when displaying a preview of a selected design in preview region 808 the client application 132 provides an updated preview of what the selected design will look like once the (or each) instance of the original asset has been replaced with an instance of the replacement asset. This is depicted in example UIs 700 and 800. In example UI 700, client application 132 displays preview page 710A of the "PitchDeck" design with the instance of the originally selected asset (in this example, a star image). In example UI 800, client application 132 displays preview page 810A of the same "PitchDeck" design with an instance of the replacement asset (in this example, a divided circle image). By operating in this manner, a user can view what their selected designs will look like after bulk editing has been performed (but before any edits are actually made).

In the present example, preview UI 800 also includes a visual indication 816 of the bulk edit that will (if the user proceeds) be performed. In the present example indication 816 includes a thumbnail of the original asset along with a thumbnail of the replacement asset.

In the present example, preview UI 800 also includes a back control 818 and a confirm edit control 820 (which, in this case, is labelled "Replace in n designs", where n is the number of designs that will be edited if the user activates the control).

In response to activating the back control 818, client application 132 may be configured close preview UI 800. In this case, client application 132 may be configured to display another UI such as design selection UI 700, asset selection UI 600, editor UI 300, or an alternative UI.

At 526, client application 132 receives user input confirming that the bulk edit should be performed. This may, for example, be user input activating the confirm edit control 820 of preview UI 800.

At 528, in response to user input confirming that the bulk edit should be performed, client application 132 generates a second request (which may also be referred to as a bulk edit request) and communicates this to the server application 114. The second request identifies the set of selected designs as determined at 520 (e.g. by design identifiers) and the replacement asset (e.g. by an asset identifier or inclusion of the actual asset data). The second request also includes (or is otherwise associated with) the original asset.

At 530, server application 114 receives the second request.

At 532, in response to receiving the second request, server application 114 edits each design in the set of selected designs identified in the second request. Specifically, for each design in the set of selected designs the server application 114 updates the design so that each instance of the original asset in that design is replaced with an instance of the replacement asset.

In the context of the example design format above, editing a design involves identifying each element record of the design that references the original asset identifier and updating that element record to replace the original asset identifier with the replacement asset identifier.

While the server application 114 is editing the designs it (and/or client application 132) may cause a progress indicator to be displayed on the client system 130. In addition, or alternatively, once all designs have been edited the server application 114 may communicate a message to the client application 132 indicating this, and in response client application 132 may display a message confirming the bulk edit is complete (e.g. a message indicating that n designs have been edited). An undo control may also be provided allowing a user to undo the bulk edit/revert the designs back to using the original asset.

While not shown in FIG. 5, the bulk edit process may be modified to account for user permissions. For example, before generating and communicating the first response at 510, server application 114 may be configured to perform additional processing to identify and filter out associated designs (as identified at 508) that the user account associated with the first request does not have permission to view and/or edit. If server application 114 identifies associated designs that the user account does not have permissions for, it may be further configured to include (e.g. in the first response) an indication that the original asset is used in additional designs that the user account does not have permissions for. On receiving such a response, client application 132 may display such information to the user. For example, client application 132 may display a permissions message in design selection UI 700 (e.g. a message such as "there are n designs that include the selected asset but you do not have permission to access" message). This informs the user that, even if they proceed with the bulk edit process, there are designs that will not be edited (and, therefore, there will be designs that continue to use the original asset rather than the replacement asset).

Where server application 114 identifies one or more designs that the user account does not have permission to edit, the client application 132 may be further configured to provide a "request permission" and/or a "notify owner" option to the user (e.g. by displaying appropriate controls in design selection UI 700).

Activation of a "request permission" control may cause the client application 132 to generate and communicate a permissions request to the server application 114. Server application may then identify the owner(s) of the design(s) in question (e.g. a user account with edit permissions for those designs) and generate/communicate request(s) to that/those owner(s). Such requests may identify the design(s) in question, the user account seeking to edit the design(s), and (optionally), information in respect of the edit being requested (e.g. the original asset and the replacement asset). If permission is granted the user may then edit the designs in the bulk edit process.

Activation of a "notify owner" control may also cause the client application 132 to generate and communicate a notify owner request to the server application 114. In response, server application 114 may identify the owner(s) of the design(s) in question (e.g. a user account with edit permissions for those designs) and communicate notification(s) to that/those owner(s). Such notifications may include information that advises the owner that the original asset has been replaced by the replacement asset in other designs. In response to such a notification, the owner may then make the same change to the design(s) they are the owner of.

As will be appreciated, providing "request permission" and/or "notify owner" operations such as this may assist teams to maintain design consistency. For example, in a team one or more "normal" users may have permission to edit most of that team's designs but permission to edit some particularly valuable/sensitive designs may be restricted to one or more "senior" users. In this case, the "normal" user can bulk edit the design(s) they have access to and then seek permission from a "senior" user to make the same edit to designs they do not have access to (or, at least, notify a "senior" user that an edit has been made to certain designs and that they may wish to update the remaining designs).

Method 500 has been described as an end-to-end process for bulk editing designs. It will be appreciated, however, that operations 502 to 514 may be performed (or be adapted to be performed) in a process for identifying designs in which a particular asset is used. Such a process need not involve identifying a replacement asset or editing designs, but rather have as its output a user interface that allows a user to view designs in which a particular asset is used. By way of example, such a user interface may be similar to design selection UI 700 described above.

Figure 9:
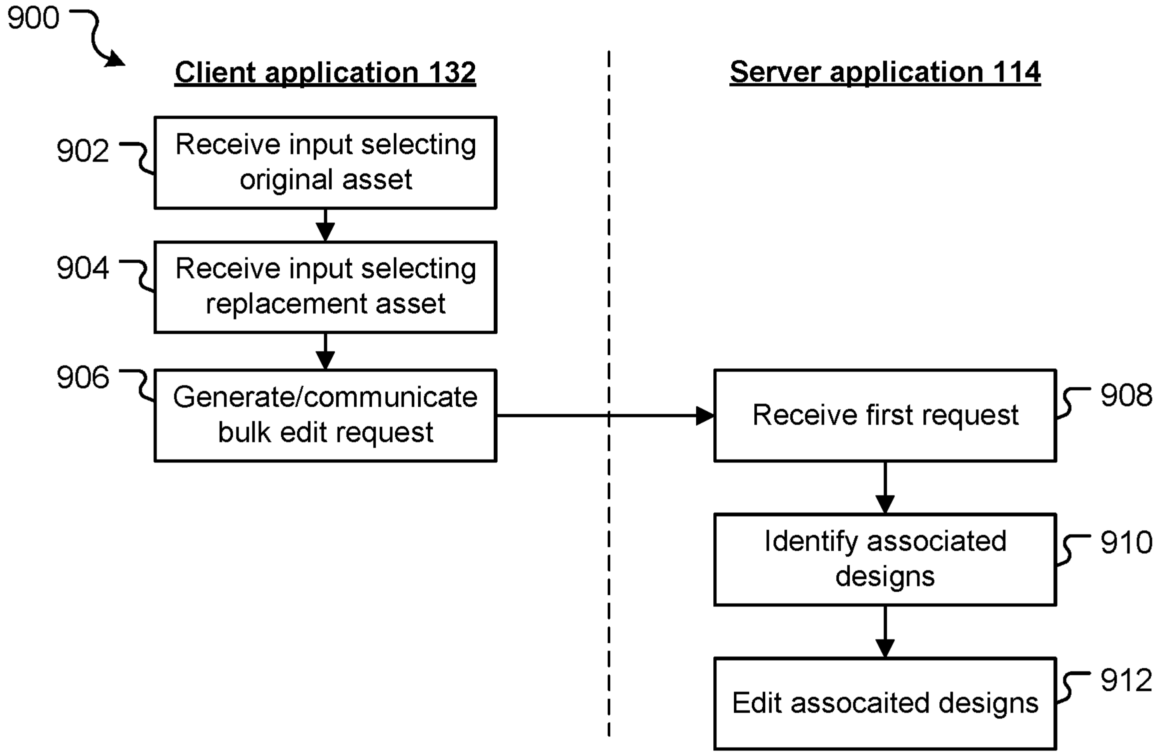
FIG. 9 depicts operations performed in an alternative process for bulk editing designs.

Turning to FIG. 9, an alternative computer implemented method 900 for performing bulk design edits will be described.

The operations of method 900 will be described as being performed by the client application 132 and server application 114 operating together. In alternative embodiments, however, the processing described may be performed by a single application (e.g. in a stand-alone implementation), by one or more alternative applications running on one or more alternative computer processing systems, or by the same applications but with operations being performed by a different application than that described.

At 902, client application 132 detects user input selecting an original asset. The first user input may be received via a user interface such as asset selection UI 600 described above.

At 904, client application 132 detects user input selecting a replacement asset. Operation 904 may be performed in a manner that is similar to, or the same as, operation 520 described above.

At 906, client 132 generates a bulk edit request and communicates this to server application 114. The bulk edit request includes or is associated with data that allows the original asset and replacement asset to be identified.

At 908, server application 114 receives the bulk edit request.

At 910, in response to receiving the bulk edit request, server application 114 identifies a set of associated designs. The set of associated designs includes designs that the original asset is used in. These will be referred to as associated designs. Operation 910 may be performed in a manner that is similar to, or the same as, operation 508 described above.

At 912, server application 114 edits each associated design in the set of associated designs identified at 910. Specifically, for each design in the set of associated designs the server application 114 updates the design so that each instance of the original asset in that design is replaced with an instance of the replacement asset. Operation 912 may be performed in a manner that is similar to, or the same as, operation 532 described above.

In the present embodiments, and as described above with reference to FIG. 4, server application 114 (or an alternative server environment application, or client application 132) is configured to emit asset event messages. In the examples described above, three types of asset events (and corresponding event messages) are contemplated: an add asset type event, a remove asset type event, and a design deletion type event. Example processing performed by server application 114 to generate and emit messages in respect of these events will be described with reference to FIGS. 10 to 12.

Figure 10:
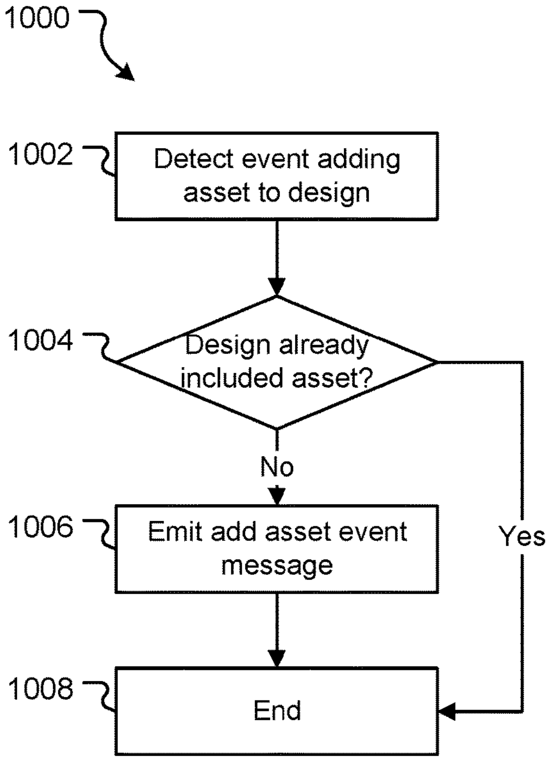
FIG. 10 depicts operations performed to emit an add asset event message.

Turning to FIG. 10, an example process 1000 for emitting an add asset event message will be described.

At 1002, server application 114 detects an event that results in a particular asset being added to a particular design. An asset may be added to a design in various ways. One example is by user input dragging and dropping a preview 312 of an asset onto canvas 304 as described above (though assets may be added to a design in other ways).

At 1004, server application 114 determines whether the design already included an instance of the asset that was added at 1002. This will be the case if an instance of the asset had previously been added to the design (and that instance had not been deleted).

Server application 114 may determine whether a design already includes an instance of an asset in various ways. For example, in certain implementations server application 114 may be configured to maintain as asset usage counter for each asset that has been added to a design. In this case, when a particular asset is added to a particular design the server application 114 increments the asset counter for that particular asset in that particular design (or, if no counter exists for that asset/design, initialises an asset counter to 1). If, following this increment, the value of the asset usage counter is greater than one, server application 114 determines that the design already included an instance of the asset. If the value of the asset usage counter is equal to one, server application 114 determines that the design did not already include an instance of that asset.

If server application 114 determines that the design did not already include the asset, processing proceeds to 1006. At 1006, server application 114 generates an add asset event message and emits this. In the present example, server application 114 emits the event message by publishing it via a publication/subscription service. Server application 114 may emit the message in other ways, or communicate the message directly to the asset tracking application 116. The add asset event message includes an identifier of the asset and an identifier of the design.

In the present embodiment, if server application 114 determines that the design already included the asset, server application 114 does not generate/emit any message (as indicated at 1008).

Figure 11:
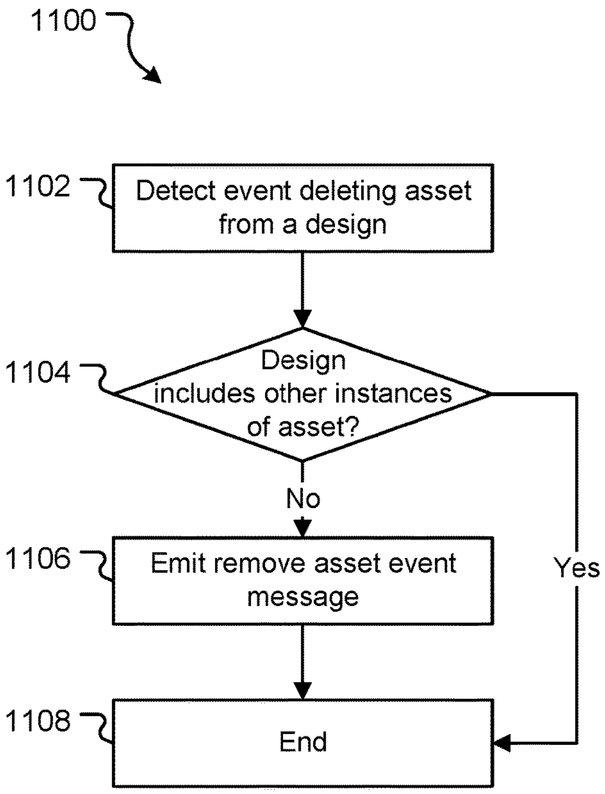
FIG. 11 depicts operations performed to emit a remove asset event message.

Turning to FIG. 11, an example process for emitting a remove asset event message will be described.

At 1102, server application 114 detects an event that results in a particular asset being removed or deleted from a particular design. An asset may be removed from a design in various ways. One example is by user input that selects the asset (e.g. on canvas 304) and deletes it.

At 1104, server application 114 determines whether, following deletion of the asset, the design still includes one or more instances of the asset. This will be the case if the design included more than one instance of the asset before the deletion event.

Server application 114 may determine whether a design still includes one or more instances of the asset in various ways. For example, and continuing the implementation example described above in which server application 114 is configured to maintain as asset usage counter for each asset that has been added to a design, server application 114 may be further configured to decrement the asset counter when an instance of an asset is deleted from a design. If, following this decrement, the value of the asset usage counter is zero, server application 114 determines that the design does not include any other instances of the asset. Conversely, if the value of the asset usage counter is greater than zero, server application 114 determines that the design does still include other instances of the asset.

If server application 114 determines that the design no longer includes any instances of the asset, processing proceeds to 1106. At 1106, server application 114 generates a remove asset event message and emits this (e.g. by publishing it via a publication/subscription service or by alternative means). The remove asset event message includes an identifier of the asset and an identifier of the design.

In the present embodiment, if server application 114 determines that the design still includes one or more instances of the asset, server application 114 does not generate/emit any message (as indicated at 1108).

Figure 12:
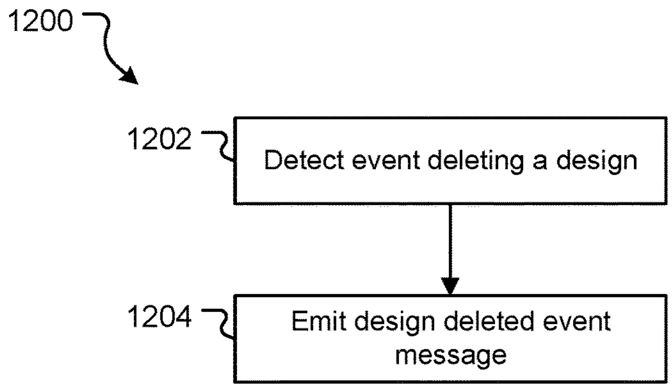
FIG. 12 depicts operations performed to emit a design deleted event message.

Turning to FIG. 12, an example process for emitting a design deleted event message will be described.

At 1202, server application 114 detects an event that results in a particular design being deleted. A design may be deleted in various ways. One example is by user input that selects the design (e.g. from a UI displaying a list of designs) and deletes it.

At 1204, server application 114 generates a design deleted event message and emits this (e.g. by publishing it via a publication/subscription service or by alternative means). The design deleted event message includes an identifier of the design that has been deleted.

In the examples described above, server application 114 is configured so that an add asset event message is only emitted the first time an asset is added to a design and a remove asset event message is only emitted when all instances of an asset have been removed from a design.

In alternative implementations, server application 114 may be configured to emit an add asset event every time an asset is added to a design and to emit a remove asset event every time an asset is removed from a design. In this case, the asset tracking application 116 may be configured to determine whether a particular design still includes one or more instances of an asset or not when updating the asset usage data. For example, the asset tracking application 116 maintain its own asset usage counters that operate in the same or a similar way to that described above. For example, when an add asset event is detected, the asset tracking application 116 may update (e.g. increment) a counter for the event asset and event design. Similarly, when a remove asset event is event is detected, the asset tracking application 116 may update (e.g. decrement) a counter for the event asset and event design. Such counters may, for example, be maintained in the relevant associated design records. For example, the following record indicates that there are currently four instances of asset A1 in design D1:

```
"assetID": "A1",
"designs": [
  {"designId": "D1", "status": "active", "usageCount":4, ...},
  ]
```

In this way, the asset tracking application 116 itself maintains a count of the number of times an asset is used in a design (and can determine when all instances of an asset have been removed from a design—e.g. if the usageCount value is 0).

The following numbered clauses describe additional, specific embodiments of the disclosure:

Clause 1. A computer implemented method including:
- receiving data identifying an original asset and data identifying a replacement asset;
- identifying, by one or more computer processing units, a set of associated designs, the set of associated designs including one or more associated designs that include at least one instance of the original asset; and
- performing, by the one or more computer processing units, a bulk edit process, the bulk edit process including editing a first associated design from the set of associated designs by replacing each instance of the original asset in the first design with an instance of the replacement asset.

Clause 2. The computer implemented method of clause 1, wherein determining the set of associated designs includes querying asset usage data, the asset usage data including one or more records that associate the original asset with the one or more associated designs that include the original asset.

Clause 3. The computer implemented method of clause 1 or clause 2, further including determining that the replacement asset is compatible with the original asset.

Clause 4. The computer implemented method of clause 3, wherein the original asset is an image-type asset, and determining that the replacement asset is compatible with the original asset includes:
- determining that the replacement asset is an image-type asset; and
- determining that the replacement asset has an aspect ratio that is compatible with an aspect ratio of the original asset.

Clause 5. The computer implemented method of any one of clauses 1 to 4, wherein performing the bulk edit process includes editing each associated design in the set of associated designs by, for each associated design in the set of associated designs, replacing each instance of the original asset in the design with an instance of the replacement asset.

Clause 6. The computer implemented method of any one of clauses 1 to 4, further including receiving data identifying a set of selected designs, the set of selected designs including one or more of the associated designs, and wherein performing the bulk edit process includes editing each associated design in the set of selected designs by, for each associated design in the set of selected designs, replacing each instance of the original asset in the design with an instance of the replacement asset.

Clause 7. The computer implemented method of any one of clauses 1 to 4, further including:

receiving a first request from a client application, the first request including the data identifying the original asset; and identifying the set of associated designs in response to receiving the first request.

Clause 8. The computer implemented method of clause 7, further including:

generating a first response including data in respect of the set of associated designs; and communicating the first response to the client application.

Clause 9. The computer implemented method of clause 8, wherein the first response causes the client application to display a design selection user interface on a client system, the design selection user interface permitting user input to select or deselect one or more of the associated designs in the set of associated designs.

Clause 10. The computer implemented method of clause 8 or clause 9, further including receiving a second request from the client application, the second request including data identifying a set of selected designs, the set of selected designs including one or more of the associated designs, and wherein performing the bulk edit process includes editing each associated design in the set of selected designs by, for each associated design in the set of selected designs, replacing each instance of the original asset in the design with the replacement asset.

Clause 11. The computer implemented method of clause 10, wherein the second request further includes the data identifying the replacement asset.

Clause 12. A computer implemented method including:

detecting a first event, the first event being an add asset event and indicating that a first instance of a first asset has been added to a first design; and in response to detecting the first event, updating asset usage data to indicate that an instance of the first asset has been added to the first design.

Clause 13. The computer implemented method of clause 12, wherein updating asset usage data to indicate that an instance of the first asset has been added to the first design includes generating and saving a first record to the asset usage data, the first record including data associating the first asset with the first design.

Clause 14. The computer implemented method of clause 12 or clause 13, wherein updating the asset usage data to indicate that an instance of the first asset has been added to the first design is performed in response to determining that the first asset is not already associated with the first design in the asset usage data.

Clause 15. The computer implemented method of any one of clauses 12 to 14, wherein updating the asset usage data to indicate that an instance of the first asset has been added to the first design includes updating a counter that maintains a count of the number of instances of the first asset in the first design.

Clause 16. The computer implemented method of any one of clauses 12 to 15, further including:

detecting a second event, the second event being a remove asset event and indicating that the first instance of the first asset has been removed from the first design; and in response to detecting the second event, updating the asset usage data to indicate that an instance of the first asset has been removed from the first design.

Clause 17. The computer implemented method of clause 16 when dependent on clause 13, wherein updating asset usage data to indicate that an instance of the first asset has been removed from the first design includes deleting the first record or flagging the first record as inactive.

Clause 18. The computer implemented method clause 17, wherein deleting the first record or flagging the first record as inactive is performed in response to determining that no other instances of the first asset are associated with the first design in the asset usage data.

Clause 19. The computer implemented method of clause 16 when dependent on clause 15, wherein updating the asset usage data to indicate that an instance of the first asset has been removed from the first design includes updating the counter that maintains the count of the number of instances of the first asset in the first design.

Clause 20. The computer implemented method of any one of clauses 12 to 19, further including:

detecting a third event, the third event being a design deleted event and indicating that the first design has been deleted; and in response to detecting the third event, updating the asset usage data to indicate that the first design has been deleted.

Clause 21. The computer implemented method of clause 20 when dependent on clause 13, wherein updating the asset usage data to indicate that the first design has been deleted includes deleting the first record or flagging the first record as inactive.

Clause 22. The computer implemented method of any one of clauses 12 to 21, wherein the first asset is an image type asset.

Clause 23. The computer implemented method of clause 2 or any one of any one of clauses 3 to 11 when dependent on clause 2, wherein the asset usage data is maintained via a process according to any one of clauses 12 to 22.

Clause 24. A computer implemented method including:

detecting a first event, the first event being an add asset event and indicating that a first instance of a first asset has been added to a first design; and in response to detecting the first event, emitting a first message with data indicating that an instance of the first asset has been added to the first design.

Clause 25. The computer implemented method of clause 24, wherein the first message includes an asset identifier that identifies the first asset and a design identifier that identifies the first design.

Clause 26. The computer implemented method of clause 24 or clause 25, wherein emitting the first message is performed in response to determining that prior to the first event the first design did not include any instances of the first asset.

Clause 27. The computer implemented method of any one of clauses 24 to 26, further including:

detecting a second event, the second event being a remove asset event and indicating that the first instance of the first asset has been removed from the first design; and in response to detecting the second event, emitting a second message with data indicating that an instance of the first asset has been removed from the first design.

Clause 28. The computer implemented method of clause 27, wherein the second message includes an asset identifier that identifies the first asset and a design identifier that identifies the first design.

Clause 29. The computer implemented method of clause 28 or clause 29, wherein emitting the second message is performed in response to determining that following the second event the first design does not include any instances of the first asset.

Clause 30. The computer implemented method of any one of clauses 24 to 29, further including:

detecting a third event, the third event being a design deleted event and indicating that the first design has been deleted; and in response to detecting the design deleted event, emitting a third message with data indicating that the first design has been deleted.

Clause 31. The computer implemented method of any one of clauses 24 to 30, wherein the first asset is an image type asset.

Clause 32. A computer processing system comprising:

one or more computer processing units; and non-transitory computer-readable medium storing instructions which, when executed by the one or more computer processing units, cause the one or more computer processing units to perform a method according to any one of clauses 1 to 31.

Clause 33. Non-transitory storage storing instructions executable by one or more computer processing units to cause the one or more computer processing units to perform a method according to any one of clauses 1 to 31.

In the above embodiments certain operations are described as being performed by the client system 130 (e.g. under control of the client application 132) and other operations are described as being performed at the server environment 110. Variations are, however, possible. For example in certain cases an operation described as being performed by client system 130 may be performed at the server environment 110 and, similarly, an operation described as being performed at the server environment 110 may be performed by the client system 130. Generally speaking, however, where user input is required such user input is initially received at client system 130 (by an input device thereof). Data representing that user input may be processed by one or more applications running on client system 130 or may be communicated to server environment 110 for one or more applications running on the server hardware 112 to process. Similarly, data or information that is to be output by a client system 130 (e.g. via display, speaker, or other output device) will ultimately involve that system 130. The data/information that is output may, however, be generated (or based on data generated) by client application 132 and/or the server environment 110 (and communicated to the client system 130 to be output).

Furthermore, in certain implementations a computer processing system 200 may be configured (by one or more applications running thereon) to perform the processing described herein entirely independently of a server environment 110. In this case, the application(s) running on that system provide a stand-alone implementation and all instructions and data required to perform the operations described above are stored on that system.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

Unless otherwise stated, the terms "include" and "comprise" (and variations thereof such as "including", "includes", "comprising", "comprises", "comprised" and the like) are used inclusively and do not exclude further features, components, integers, steps, or elements.

In certain instances the present disclosure uses terms "first," "second," etc. to describe various elements. Unless stated otherwise, these terms are used only to distinguish elements from one another and not in an ordinal sense. For example, a first user input could be termed a second user input or vice versa without departing from the scope of the described examples. Furthermore, when the terms "first", "second", etc. are used to differentiate elements or features, a second user input could exist without a first user input. For example, a second user input could occur before a first user input (or without a first user input ever occurring).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method including:

receiving data identifying an original asset and data identifying a replacement asset, wherein the replacement asset and the original asset are different assets;

identifying, by one or more computer processing units, a set of associated designs, wherein:

the set of associated designs includes a first associated design and a second associated design;

the first associated design is defined by first design data;

the first design data defines a first design page of the first design and a first set of elements that are positioned on the first design page;

the first set of elements includes a first instance of the original asset;

the second associated design is defined by second design data;

the second design data defines a second design page of the second design and a second set of elements that are positioned on the second design page;

the second set of elements includes a second instance of the original asset;

the second design data defines a third design page of the second design and a third set of elements that are positioned on the third design page;

the third set of elements includes a third instance of the original asset; and performing a bulk edit process, wherein the bulk edit process includes:

editing the first design data by replacing the first instance of the original asset with a first instance of the replacement asset; and editing the second design data by:

replacing the second instance of the original asset with a second instance of the replacement asset; and replacing the third instance of the original asset with a third instance of the replacement asset.

2. The computer implemented method of claim 1, wherein the original asset is an image-type asset.

3. The computer implemented method of claim 1, wherein identifying the set of associated designs includes querying asset usage data, the asset usage data including one or more records that associate the original asset with the first associated design and the second associated design.

4. The computer implemented method of claim 1, further including:

determining that the replacement asset is compatible with the original asset; and performing the bulk edit process in response to determining that the replacement asset is compatible with the original asset.

5. The computer implemented method of claim 4, wherein the original asset is an image-type asset and determining that the replacement asset is compatible with the original asset includes:

determining that the replacement asset is an image-type asset; and determining that the replacement asset has an aspect ratio that is compatible with an aspect ratio of the original asset.

6. The computer implemented method of claim 1, further including:

receiving a first request from a client application, the first request including the data identifying the original asset;

automatically identifying the set of associated designs in response to receiving the first request;

generating a first response including data in respect of the set of associated designs; and communicating the first response to the client application, wherein the first response causes the client application to display a design selection user interface on a client system, the design selection user interface permitting user input to select or deselect one or more of the first associated design and the second associated design.

7. The computer implemented method of claim 6, further including:

receiving a second request from the client application, wherein the second request includes data identifying a set of selected designs, and the set of selected designs includes the first associated design and the second associated design; and performing the bulk edit process in response to receiving the second request.

8. The computer implemented method of claim 7, wherein the second request further includes the data identifying the replacement asset.

9. The computer implemented method of claim 1, wherein:

the first set of elements includes a at least one element that is not an instance of the original asset.

10. A computer implemented method including:

receiving, via a user input device, user input identifying an original asset, wherein the replacement asset and the original asset are different assets;

identifying, by one or more computer processing units, a set of associated designs, wherein:

the set of associated designs includes a first associated design and a second associated design;

the first associated design is defined by first design data;

the first design data defines a first design page of the first design and a first set of elements that are positioned on the first design page;

the first set of elements includes a first instance of the original asset; and the second associated design is defined by second design data;

the second design data defines a second design page of the second design and a second set of elements that are positioned on the second design page;

the second set of elements includes a second instance of the original asset;

the second design data defines a third design page of the second design and a third set of elements that are positioned on the third design page;

the third set of elements includes a third instance of the original asset; and receiving user input identifying a replacement asset; and performing a bulk edit process, wherein the bulk edit process including:

editing the first design data by replacing the first instance of the original asset with a first instance of the replacement asset; and editing the second design data by:

replacing the second instance of the original asset with a second instance of the replacement asset; and replacing the third instance of the original asset with a third instance of the replacement asset.

11. The computer implemented method of claim 10, wherein the original asset is an image-type asset.

12. The computer implemented method of claim 10, wherein identifying the set of associated designs includes:

generating a first request that includes an identifier of the original asset;

communicating the first request to a server application; and receiving a first response that includes data identifying the set of associated designs.

13. The computer implemented method of claim 10, further including:

displaying a design selection user interface, the design selection user interface permitting user input to select or deselect one or more of the associated designs in the set of associated designs.

14. The computer implemented method of claim 13, wherein the design selection user interface includes a first original design preview, the first original design preview showing the first associated design prior to replacing each instance of the original asset in the first associated design with an instance of the replacement asset.

15. The computer implemented method of claim 10, wherein:

the first set of elements includes a at least one element that is not an instance of the original asset.

16. A computer processing system including:

one or more computer processing units; and non-transitory computer-readable medium storing instructions which, when executed by the one or more computer processing units, cause the one or more computer processing units to perform a method including:

receiving data identifying an original asset and data identifying a replacement asset, wherein the replacement asset and the original asset are different assets;

identifying a set of associated designs, wherein:

the set of associated designs includes a first associated design and a second associated design;

the first associated design is defined by first design data;

the first design data defines a first design page of the first design and a first set of elements that are positioned on the first design page;

the first set of elements includes a first instance of the original asset;

the second associated design is defined by second design data;

the second design data defines a second design page of the second design and a second set of elements that are positioned on the second design page;

the second set of elements includes a second instance of the original asset;

the second design data defines a third design page of the second design and a third set of elements that are positioned on the third design page;

the third set of elements includes a third instance of the original asset; and performing a bulk edit process, wherein the bulk edit process includes:

editing the first design data by replacing the first instance of the original asset with a first instance of the replacement asset; and editing the second design data by:

replacing the second instance of the original asset with a second instance of the replacement asset; and replacing the third instance of the original asset with a third instance of the replacement asset.

17. The computer processing system of claim 16, wherein:

the first set of elements includes a at least one element that is not an instance of the original asset.

18. Non-transitory storage storing instructions executable by one or more computer processing units to cause the one or more computer processing units to perform a method including:

receiving data identifying an original asset and data identifying a replacement asset, wherein the replacement asset and the original asset are different assets;

identifying a set of associated designs, wherein:

the set of associated designs includes a first associated design and a second associated design;

the first associated design is defined by first design data;

the first design data defines a first design page of the first design and a first set of elements that are positioned on the first design page;

the first set of elements includes a first instance of the original asset;

the second associated design is defined by second design data;

the second design data defines a second design page of the second design and a second set of elements that are positioned on the second design page;

the second set of elements includes a second instance of the original asset;

the second design data defines a third design page of the second design and a third set of elements that are positioned on the third design page;

the third set of elements includes a third instance of the original asset; and performing a bulk edit process, wherein the bulk edit process includes:

editing the first design data by replacing the first instance of the original asset with a first instance of the replacement asset; and editing the second design data by:

replacing the second instance of the original asset with a second instance of the replacement asset; and replacing the third instance of the original asset with a third instance of the replacement asset.

19. The non-transitory storage of claim 18, wherein:

the first set of elements includes a at least one element that is not an instance of the original asset.

* * * * *